(12) United States Patent
Sloss et al.

(10) Patent No.: US 12,446,888 B2
(45) Date of Patent: Oct. 21, 2025

(54) TWISTER IMPLANT DETACHMENT MECHANISM

(71) Applicant: DePuy Synthes Products, Inc., Raynham, MA (US)

(72) Inventors: Scott Sloss, Raynham, MA (US); Megan Greenwood, Raynham, MA (US); Tushar Sharma, Raynham, MA (US); William Cohn, Raynham, MA (US)

(73) Assignee: DEPUY SYNTHES PRODUCTS, INC, Raynham, MA (US)

( * ) Notice: Subject to any disclaimer, the term of this patent is extended or adjusted under 35 U.S.C. 154(b) by 149 days.

(21) Appl. No.: 17/896,309

(22) Filed: Aug. 26, 2022

(65) Prior Publication Data

US 2024/0065699 A1 Feb. 29, 2024

(51) Int. Cl.
*A61B 17/12* (2006.01)
(52) U.S. Cl.
CPC .... *A61B 17/1214* (2013.01); *A61B 17/12022* (2013.01)
(58) Field of Classification Search
CPC .......... A61B 17/1214; A61B 17/12022; A61B 17/12054; A61F 2002/9505; A61F 2002/9511; A61F 2/011; A61F 2/95
See application file for complete search history.

(56) References Cited

U.S. PATENT DOCUMENTS

| | | | |
|---|---|---|---|
| 3,429,408 A | 2/1969 | Maker et al. | |
| 5,108,407 A | 4/1992 | Geremia et al. | |
| 5,122,136 A | 6/1992 | Guglielmi et al. | |
| 5,217,484 A | 6/1993 | Marks | |
| 5,250,071 A | 10/1993 | Palermo | |

(Continued)

FOREIGN PATENT DOCUMENTS

| | | |
|---|---|---|
| EP | 1728478 A1 | 12/2006 |
| EP | 1985244 A2 | 10/2008 |

(Continued)

OTHER PUBLICATIONS

Extended European Search Report for European Application No. 20196478.0, mailed Jan. 25, 2021, 11 Pages.

(Continued)

*Primary Examiner* — Darwin P Erezo
*Assistant Examiner* — Zehra Jaffri
(74) *Attorney, Agent, or Firm* — Troutman Pepper Lock LLP (57) ABSTRACT

An endovascular implant detachment mechanism is disclosed that can include an endovascular implant, a connector, a push wire, and one or more lock wires. The connector can be attached to a pinched end of the implant and can include an aperture at a second end. The connector can include a generally circular cavity distal to the aperture. The push wire can have a distal end including one or more slotted openings and configured to fit into the aperture in a first orientation. The one or more lock wires can be configured to fit into the aperture while the distal end of the push wire is in a second orientation. Axial rotation of the push wire can cause the distal end of the push wire to move from the first orientation into the second orientation and secure the push wire to the implant.

18 Claims, 6 Drawing Sheets

(56) References Cited

U.S. PATENT DOCUMENTS

| | | | |
|---|---|---|---|
| 5,263,964 A | 11/1993 | Purdy | |
| 5,334,210 A | 8/1994 | Gianturco | |
| 5,350,397 A | 9/1994 | Palermo et al. | |
| 5,382,259 A | 1/1995 | Phelps et al. | |
| 5,417,708 A | 5/1995 | Hall et al. | |
| 5,484,409 A | 1/1996 | Atkinson et al. | |
| 5,569,221 A | 10/1996 | Houser et al. | |
| 5,582,619 A | 12/1996 | Ken | |
| 5,624,449 A | 4/1997 | Pham et al. | |
| 5,853,418 A | 12/1998 | Ken et al. | |
| 5,899,935 A | 5/1999 | Ding | |
| 5,925,059 A | 7/1999 | Palermo et al. | |
| 6,113,622 A | 9/2000 | Tieshima | |
| 6,203,547 B1 | 3/2001 | Nguyen et al. | |
| 6,334,864 B1 | 1/2002 | Amplatz et al. | |
| 6,368,338 B1 | 4/2002 | Konya et al. | |
| 6,391,037 B1 | 5/2002 | Greenhalgh | |
| 6,454,780 B1 | 9/2002 | Wallace | |
| 6,506,204 B2 | 1/2003 | Mazzocchi | |
| 6,561,988 B1 | 5/2003 | Turturro et al. | |
| 6,636,758 B2 | 10/2003 | Sanchez et al. | |
| 7,367,987 B2 | 5/2008 | Balgobin et al. | |
| 7,371,251 B2 | 5/2008 | Mitelberg et al. | |
| 7,371,252 B2 | 5/2008 | Balgobin et al. | |
| 7,377,932 B2 | 5/2008 | Mitelberg et al. | |
| 7,708,754 B2 | 5/2010 | Balgobin et al. | |
| 7,708,755 B2 | 5/2010 | Davis, III et al. | |
| 7,722,636 B2 | 5/2010 | Farnan | |
| 7,799,052 B2 | 9/2010 | Balgobin et al. | |
| 7,811,305 B2 | 10/2010 | Balgobin et al. | |
| 7,819,891 B2 | 10/2010 | Balgobin et al. | |
| 7,819,892 B2 | 10/2010 | Balgobin et al. | |
| 7,901,444 B2 | 3/2011 | Slazas | |
| 7,942,894 B2 | 5/2011 | West | |
| 7,985,238 B2 | 7/2011 | Balgobin et al. | |
| 8,062,325 B2 | 11/2011 | Mitelberg et al. | |
| 8,333,796 B2 | 12/2012 | Tompkins et al. | |
| 8,449,591 B2 | 5/2013 | Litzenberg et al. | |
| 8,795,316 B2 | 8/2014 | Balgobin et al. | |
| 8,974,488 B2 | 3/2015 | Tan et al. | |
| 9,155,540 B2 | 10/2015 | Lorenzo | |
| 9,232,992 B2 | 1/2016 | Heidner | |
| 9,314,326 B2 | 4/2016 | Wallace et al. | |
| 9,486,223 B2 | 11/2016 | Que et al. | |
| 9,532,792 B2 | 1/2017 | Galdonik et al. | |
| 9,532,873 B2 | 1/2017 | Kelley | |
| 9,533,344 B2 | 1/2017 | Monetti et al. | |
| 9,539,011 B2 | 1/2017 | Chen et al. | |
| 9,539,022 B2 | 1/2017 | Bowman et al. | |
| 9,539,122 B2 | 1/2017 | Burke et al. | |
| 9,539,382 B2 | 1/2017 | Nelson | |
| 9,549,830 B2 | 1/2017 | Bruszewski et al. | |
| 9,554,805 B2 | 1/2017 | Tompkins et al. | |
| 9,561,125 B2 | 2/2017 | Bowman et al. | |
| 9,572,982 B2 | 2/2017 | Burnes et al. | |
| 9,579,484 B2 | 2/2017 | Barnell | |
| 9,585,642 B2 | 3/2017 | Dinsmoor et al. | |
| 9,615,832 B2 | 4/2017 | Bose et al. | |
| 9,615,951 B2 | 4/2017 | Bennett et al. | |
| 9,622,753 B2 | 4/2017 | Cox | |
| 9,636,115 B2 | 5/2017 | Henry et al. | |
| 9,636,439 B2 | 5/2017 | Chu et al. | |
| 9,642,675 B2 | 5/2017 | Werneth et al. | |
| 9,655,633 B2 | 5/2017 | Leynov et al. | |
| 9,655,645 B2 | 5/2017 | Staunton | |
| 9,655,989 B2 | 5/2017 | Cruise et al. | |
| 9,662,120 B2 | 5/2017 | Lagodzki et al. | |
| 9,662,129 B2 | 5/2017 | Galdonik et al. | |
| 9,662,238 B2 | 5/2017 | Dwork et al. | |
| 9,662,425 B2 | 5/2017 | Lilja et al. | |
| 9,668,898 B2 | 6/2017 | Wong | |
| 9,675,477 B2 | 6/2017 | Thompson | |
| 9,675,782 B2 | 6/2017 | Connolly | |
| 9,676,022 B2 | 6/2017 | Ensign et al. | |
| 9,692,557 B2 | 6/2017 | Murphy | |
| 9,693,852 B2 | 7/2017 | Lam et al. | |
| 9,700,262 B2 | 7/2017 | Janik et al. | |
| 9,700,399 B2 | 7/2017 | Acosta-Acevedo | |
| 9,717,421 B2 | 8/2017 | Griswold et al. | |
| 9,717,500 B2 | 8/2017 | Tieu et al. | |
| 9,717,502 B2 | 8/2017 | Teoh et al. | |
| 9,724,103 B2 | 8/2017 | Cruise et al. | |
| 9,724,526 B2 | 8/2017 | Strother et al. | |
| 9,750,565 B2 | 9/2017 | Bloom et al. | |
| 9,757,260 B2 | 9/2017 | Greenan | |
| 9,764,111 B2 | 9/2017 | Gulachenski | |
| 9,770,251 B2 | 9/2017 | Bowman et al. | |
| 9,770,577 B2 | 9/2017 | Li et al. | |
| 9,775,621 B2 | 10/2017 | Tompkins et al. | |
| 9,775,706 B2 | 10/2017 | Peterson et al. | |
| 9,775,732 B2 | 10/2017 | Khenansho | |
| 9,788,800 B2 | 10/2017 | Mayoras, Jr. | |
| 9,795,391 B2 | 10/2017 | Saatchi et al. | |
| 9,801,980 B2 | 10/2017 | Karino et al. | |
| 9,808,599 B2 | 11/2017 | Bowman | |
| 9,833,252 B2 | 12/2017 | Sepetka et al. | |
| 9,833,604 B2 | 12/2017 | Lam et al. | |
| 9,833,625 B2 | 12/2017 | Waldhauser et al. | |
| 9,907,555 B2 | 3/2018 | Buiser et al. | |
| 9,918,718 B2 | 3/2018 | Lorenzo | |
| 10,034,670 B2 | 7/2018 | Elgård et al. | |
| 10,282,851 B2 | 5/2019 | Gorochow | |
| 10,285,710 B2 | 5/2019 | Lorenzo et al. | |
| 10,517,604 B2 | 12/2019 | Bowman et al. | |
| 10,653,425 B1 | 5/2020 | Gorochow et al. | |
| 10,806,402 B2 | 10/2020 | Cadieu et al. | |
| 10,806,461 B2 | 10/2020 | Lorenzo | |
| 10,806,462 B2 | 10/2020 | Lorenzo | |
| 10,888,331 B2 | 1/2021 | Pederson et al. | |
| 11,051,928 B2 | 7/2021 | Casey et al. | |
| 2001/0049519 A1 | 12/2001 | Holman et al. | |
| 2001/0056281 A1 | 12/2001 | Wallace et al. | |
| 2002/0055767 A1* | 5/2002 | Forde | A61F 2/962 623/1.11 |
| 2002/0072705 A1 | 6/2002 | Vrba et al. | |
| 2002/0165569 A1 | 11/2002 | Ramzipoor et al. | |
| 2003/0216757 A1 | 11/2003 | Gerberding | |
| 2004/0002731 A1 | 1/2004 | Aganon et al. | |
| 2004/0034363 A1 | 2/2004 | Wilson et al. | |
| 2004/0059367 A1 | 3/2004 | Davis et al. | |
| 2004/0087964 A1 | 5/2004 | Diaz et al. | |
| 2005/0149108 A1 | 7/2005 | Cox | |
| 2006/0025802 A1 | 2/2006 | Sowers | |
| 2006/0064151 A1 | 3/2006 | Guterman | |
| 2006/0111771 A1 | 5/2006 | Ton et al. | |
| 2006/0116711 A1 | 6/2006 | Elliott et al. | |
| 2006/0135021 A1 | 6/2006 | Calhoun et al. | |
| 2006/0155303 A1 | 7/2006 | Konya et al. | |
| 2006/0276824 A1 | 12/2006 | Mitelberg et al. | |
| 2006/0276825 A1 | 12/2006 | Mitelberg et al. | |
| 2006/0276826 A1 | 12/2006 | Mitelberg et al. | |
| 2006/0276827 A1 | 12/2006 | Mitelberg et al. | |
| 2006/0276830 A1 | 12/2006 | Balgobin et al. | |
| 2006/0276833 A1 | 12/2006 | Balgobin et al. | |
| 2007/0010850 A1 | 1/2007 | Balgobin et al. | |
| 2007/0083132 A1 | 4/2007 | Sharrow | |
| 2007/0083226 A1 | 4/2007 | Buiser et al. | |
| 2007/0123927 A1* | 5/2007 | Farnan | A61B 17/1214 606/200 |
| 2007/0179520 A1 | 8/2007 | West | |
| 2007/0203519 A1 | 8/2007 | Lorenzo et al. | |
| 2007/0233168 A1 | 10/2007 | Davis et al. | |
| 2007/0270903 A1 | 11/2007 | Davis, III et al. | |
| 2007/0270930 A1 | 11/2007 | Schenck | |
| 2007/0299422 A1 | 12/2007 | Inganas et al. | |
| 2008/0027561 A1 | 1/2008 | Mitelberg et al. | |
| 2008/0035160 A1 | 2/2008 | Woodson et al. | |
| 2008/0045997 A1 | 2/2008 | Balgobin et al. | |
| 2008/0082113 A1 | 4/2008 | Bishop et al. | |
| 2008/0097462 A1 | 4/2008 | Mitelberg et al. | |
| 2008/0119887 A1 | 5/2008 | Que et al. | |
| 2008/0221654 A1 | 9/2008 | Buiser et al. | |
| 2008/0281350 A1 | 11/2008 | Sepetka | |
| 2008/0300616 A1 | 12/2008 | Que et al. | |

(56) References Cited

U.S. PATENT DOCUMENTS

| | | |
|---|---|---|
| 2008/0306503 A1 | 12/2008 | Que et al. |
| 2009/0036877 A1 | 2/2009 | Nardone et al. |
| 2009/0043331 A1* | 2/2009 | Buiser .............. A61B 17/12022 606/195 |
| 2009/0062726 A1 | 3/2009 | Ford et al. |
| 2009/0099592 A1 | 4/2009 | Buiser et al. |
| 2009/0177261 A1 | 7/2009 | Teoh et al. |
| 2009/0312748 A1 | 12/2009 | Johnson et al. |
| 2010/0094395 A1 | 4/2010 | Kellett |
| 2010/0114017 A1 | 5/2010 | Lenker et al. |
| 2010/0160944 A1 | 6/2010 | Teoh et al. |
| 2010/0324649 A1 | 12/2010 | Mattsson |
| 2011/0046610 A1* | 2/2011 | Schaeffer .............. A61M 39/10 604/533 |
| 2011/0092997 A1 | 4/2011 | Kang |
| 2011/0295303 A1 | 12/2011 | Freudenthal |
| 2012/0035707 A1 | 2/2012 | Mitelberg et al. |
| 2012/0041472 A1 | 2/2012 | Tan et al. |
| 2012/0283768 A1 | 11/2012 | Cox et al. |
| 2013/0066413 A1 | 3/2013 | Jin et al. |
| 2013/0138136 A1 | 5/2013 | Beckham et al. |
| 2013/0338701 A1 | 12/2013 | Wilson et al. |
| 2014/0058435 A1 | 2/2014 | Jones et al. |
| 2014/0135812 A1 | 5/2014 | Divino et al. |
| 2014/0200607 A1 | 7/2014 | Sepetka et al. |
| 2014/0207175 A1 | 7/2014 | Aggerholm |
| 2014/0277085 A1 | 9/2014 | Mirigian et al. |
| 2014/0277092 A1 | 9/2014 | Teoh et al. |
| 2014/0277093 A1 | 9/2014 | Guo et al. |
| 2014/0277366 A1* | 9/2014 | Cummins .................. A61F 2/95 623/1.12 |
| 2015/0112378 A1 | 4/2015 | Torp |
| 2015/0182227 A1 | 7/2015 | Le et al. |
| 2015/0230802 A1 | 8/2015 | Lagodzki et al. |
| 2015/0335333 A1 | 11/2015 | Jones et al. |
| 2016/0022275 A1 | 1/2016 | Garza |
| 2016/0157869 A1 | 6/2016 | Elgård et al. |
| 2016/0228125 A1 | 8/2016 | Pederson, Jr. et al. |
| 2016/0310304 A1 | 10/2016 | Mialhe |
| 2016/0346508 A1 | 12/2016 | Williams et al. |
| 2017/0007264 A1 | 1/2017 | Cruise et al. |
| 2017/0007265 A1 | 1/2017 | Guo et al. |
| 2017/0020670 A1 | 1/2017 | Murray et al. |
| 2017/0020700 A1 | 1/2017 | Bienvenu et al. |
| 2017/0027640 A1 | 2/2017 | Kunis et al. |
| 2017/0027692 A1 | 2/2017 | Bonhoeffer et al. |
| 2017/0027725 A1 | 2/2017 | Argentine |
| 2017/0035436 A1 | 2/2017 | Morita |
| 2017/0035567 A1 | 2/2017 | Duffy |
| 2017/0042548 A1 | 2/2017 | Lam |
| 2017/0049596 A1 | 2/2017 | Schabert |
| 2017/0071737 A1 | 3/2017 | Kelley |
| 2017/0072452 A1 | 3/2017 | Monetti et al. |
| 2017/0079671 A1 | 3/2017 | Morero et al. |
| 2017/0079680 A1 | 3/2017 | Bowman |
| 2017/0079766 A1 | 3/2017 | Wang et al. |
| 2017/0079767 A1 | 3/2017 | Leon-Yip |
| 2017/0079812 A1 | 3/2017 | Lam et al. |
| 2017/0079817 A1 | 3/2017 | Sepetka et al. |
| 2017/0079819 A1 | 3/2017 | Pung et al. |
| 2017/0079820 A1 | 3/2017 | Lam et al. |
| 2017/0086851 A1 | 3/2017 | Wallace et al. |
| 2017/0086996 A1 | 3/2017 | Peterson et al. |
| 2017/0095259 A1 | 4/2017 | Tompkins et al. |
| 2017/0100126 A1 | 4/2017 | Bowman et al. |
| 2017/0100141 A1 | 4/2017 | Morero et al. |
| 2017/0100143 A1 | 4/2017 | Granfield |
| 2017/0100183 A1 | 4/2017 | Iaizzo et al. |
| 2017/0105739 A1 | 4/2017 | Dias et al. |
| 2017/0113023 A1 | 4/2017 | Steingisser et al. |
| 2017/0135801 A1 | 5/2017 | Delaney, Jr. et al. |
| 2017/0147765 A1 | 5/2017 | Mehta |
| 2017/0151032 A1 | 6/2017 | Loisel |
| 2017/0165062 A1 | 6/2017 | Rothstein |
| 2017/0165065 A1 | 6/2017 | Rothstein et al. |
| 2017/0165454 A1 | 6/2017 | Tuohy et al. |
| 2017/0172581 A1 | 6/2017 | Bose et al. |
| 2017/0172766 A1 | 6/2017 | Vong et al. |
| 2017/0172772 A1 | 6/2017 | Khenansho |
| 2017/0189033 A1 | 7/2017 | Sepetka et al. |
| 2017/0189035 A1 | 7/2017 | Porter |
| 2017/0215902 A1 | 8/2017 | Leynov et al. |
| 2017/0216484 A1 | 8/2017 | Cruise et al. |
| 2017/0224350 A1 | 8/2017 | Shimizu et al. |
| 2017/0224355 A1 | 8/2017 | Bowman et al. |
| 2017/0224467 A1 | 8/2017 | Piccagli et al. |
| 2017/0224511 A1 | 8/2017 | Dwork et al. |
| 2017/0224953 A1 | 8/2017 | Tran et al. |
| 2017/0231749 A1 | 8/2017 | Perkins et al. |
| 2017/0245864 A1 | 8/2017 | Franano et al. |
| 2017/0245885 A1 | 8/2017 | Lenker |
| 2017/0252064 A1 | 9/2017 | Staunton |
| 2017/0258476 A1 | 9/2017 | Hayakawa et al. |
| 2017/0265983 A1 | 9/2017 | Lam et al. |
| 2017/0281192 A1 | 10/2017 | Tieu et al. |
| 2017/0281331 A1 | 10/2017 | Perkins et al. |
| 2017/0281344 A1 | 10/2017 | Costello |
| 2017/0281909 A1 | 10/2017 | Northrop et al. |
| 2017/0281912 A1 | 10/2017 | Melder et al. |
| 2017/0290593 A1 | 10/2017 | Cruise et al. |
| 2017/0290654 A1 | 10/2017 | Sethna |
| 2017/0296324 A1 | 10/2017 | Argentine |
| 2017/0296325 A1 | 10/2017 | Marrocco et al. |
| 2017/0303939 A1 | 10/2017 | Greenhalgh et al. |
| 2017/0303942 A1 | 10/2017 | Greenhalgh et al. |
| 2017/0303947 A1 | 10/2017 | Greenhalgh et al. |
| 2017/0303948 A1 | 10/2017 | Wallace et al. |
| 2017/0304041 A1 | 10/2017 | Argentine |
| 2017/0304097 A1 | 10/2017 | Corwin et al. |
| 2017/0304595 A1 | 10/2017 | Nagasrinivasa et al. |
| 2017/0312109 A1 | 11/2017 | Le |
| 2017/0312484 A1 | 11/2017 | Shipley et al. |
| 2017/0316561 A1 | 11/2017 | Helm et al. |
| 2017/0319826 A1 | 11/2017 | Bowman et al. |
| 2017/0333228 A1 | 11/2017 | Orth et al. |
| 2017/0333236 A1 | 11/2017 | Greenan |
| 2017/0333678 A1 | 11/2017 | Bowman et al. |
| 2017/0340383 A1 | 11/2017 | Bloom et al. |
| 2017/0348014 A1 | 12/2017 | Wallace et al. |
| 2017/0348514 A1 | 12/2017 | Guyon et al. |
| 2018/0028779 A1 | 2/2018 | von Oepen et al. |
| 2018/0228493 A1 | 8/2018 | Aguilar et al. |
| 2018/0250150 A1 | 9/2018 | Majercak et al. |
| 2018/0280667 A1 | 10/2018 | Keren |
| 2018/0289375 A1 | 10/2018 | Hebert et al. |
| 2018/0325706 A1 | 11/2018 | Hebert et al. |
| 2019/0192162 A1 | 6/2019 | Lorenzo et al. |
| 2019/0254678 A1* | 8/2019 | Dinges .............. A61B 17/12022 |
| 2019/0255290 A1 | 8/2019 | Snyder et al. |
| 2019/0328398 A1 | 10/2019 | Lorenzo |
| 2020/0093499 A1 | 3/2020 | Lorenzo et al. |
| 2020/0229957 A1 | 7/2020 | Bardsley et al. |
| 2021/0001082 A1 | 1/2021 | Orenzo et al. |
| 2021/0186513 A1* | 6/2021 | Hoshino ............ A61B 17/1214 |

FOREIGN PATENT DOCUMENTS

| | | |
|---|---|---|
| EP | 3092956 A1 | 11/2016 |
| EP | 3501427 A1 | 6/2019 |
| EP | 3760139 A2 | 1/2021 |
| JP | 2006-334408 A | 12/2006 |
| JP | 2012-000464 A | 1/2012 |
| JP | 2012-523943 A | 10/2012 |
| JP | 2013-78584 A | 5/2013 |
| JP | 2013-212372 A | 10/2013 |
| WO | WO 2012/158152 A1 | 11/2012 |

OTHER PUBLICATIONS

Extended European Search Report for European Application No. 22184571.2, mailed Dec. 8, 2022, 8 pages.

Extended European Search Report for European Application No. 22184574.6, mailed Dec. 6, 2022, 10 pages.

(56) References Cited

OTHER PUBLICATIONS

International Search Report issued in PCT/IB2023/058390 dated Oct. 25, 2023 submitted herewith.

\* cited by examiner

TWISTER IMPLANT DETACHMENT MECHANISM

FIELD OF INVENTION

The present invention generally relates to medical instruments, and more particularly, to embolic implants detachment mechanisms for aneurysm therapy.

BACKGROUND

Cranial aneurysms can be complicated and difficult to treat due to their proximity to critical brain tissues. Recently, tubular braided implants have been introduced that have the potential to treat an aneurysm or other arterio-venous malformation easily, accurately, and safely in a parent vessel without blocking flow into perforator vessels communicating with the parent vessel. Implant devices for treating aneurysms must be delivered through long, small, tortuous blood vessels and positioning must be controlled precisely to ensure aneurysm filling without causing additional occlusions or clotting in nearby vessels. Accordingly, it is necessary to have a delivery and detachment mechanism providing the connection point between a tubular braided implant and a delivery catheter that has the ability to deliver, position, manipulate, and then release the implant.

SUMMARY

It is an object of the present invention to provide systems, devices, and methods to meet the above-stated needs. Generally, it is an object of the present invention to provide an endovascular implant detachment mechanism. The detachment mechanism can include an endovascular implant that includes a pinched end. The detachment mechanism can include a connector attached to the pinched end of the implant at a first end and including an aperture at a second end. The connector part of the detachment mechanism can include a generally circular cavity that is distal to the aperture. The detachment mechanism can include a push wire having a distal end. The distal end can include one or more slotted openings. The distal end can be configured to fit into the aperture in a first orientation (e.g., detached) with respect to the aperture. The detachment mechanism can include one or more lock wires that are configured to fit into the aperture while the distal end of the push wire is in a second orientation. Axial rotation of the push wire can cause the distal end of the push wire to move from the first orientation into a second orientation (e.g., attached), which can thereby secure the push wire to the endovascular implant.

In some examples, the connector can be configured to detach from the push wire in response to the removal of the one or more lock wires from the aperture and axial rotation of the distal end of the push wire from second orientation to the first orientation.

In some examples, the detachment mechanism can include a spring that is integrated within the generally circular cavity. The spring can be configured to rotate the distal end of the push wire from the second orientation to the first orientation in response to the removal of the one or more lock wires.

In some examples, the one or more lock wires can be configured to prevent the spring from rotating the distal end of the push wire from the second orientation to the first orientation while the one or more lock wires are positioned within the aperture.

In some examples, the connector can further include a sloped interior surface that is configured to facilitate axial rotation of the distal end of the push wire from the second orientation to the first orientation in response to pulling the push wire in a proximal direction.

In some examples, the one or more lock wires can include two lock wires.

In some examples, the one or more lock wires can be effective to prevent axial rotation of the distal end of the push wire from the second orientation to the first orientation while the one or more lock wires are positioned within the aperture of the connector.

In some examples, the detachment mechanism can further include a microcatheter sized to deliver the endovascular implant to a treatment site while the endovascular implant is in a non-deployed configuration.

In some examples, the push wire can be configured to push the endovascular implant through the microcatheter and to the treatment site.

In some examples, the endovascular implant can be configured to expand to a deployed configuration to occlude a substantially spherical cavity.

In another aspect, an endovascular implant detachment mechanism is disclosed. The detachment mechanism can include an endovascular implant including a pinched end. The detachment mechanism can include a connector attached to the pinched end at a first end and including an aperture at a second end. The detachment mechanism can include a generally circular cavity distal to the aperture. The detachment mechanism can include a push wire having a distal end. The distal end can include one or more slotted openings. The distal end can be configured to fit into the aperture in a first orientation (e.g., detached) with respect to the aperture. The detachment mechanism can include one or more lock wires that are configured to fit into the aperture while the distal end of the push wire is in a second orientation. The detachment mechanism can include a spring disposed within the generally circular cavity. The spring can be configured to rotate the distal end of the push wire from a second orientation to the first orientation in response to the removal of the one or more lock wires. Axial rotation of the push wire can cause the distal end of the push wire to move from the first orientation to the second orientation (e.g., attached), which can thereby secure the push wire to the endovascular implant.

In some examples, the connector is configured to detach from the push wire in response to the removal of the one or more lock wires from the aperture and axial rotation of the distal end of the push wire from the second orientation to the first orientation.

In some examples, the one or more lock wires can be configured to prevent the spring from rotating the distal end of the push wire from the second orientation to the first orientation while the one or more lock wires are positioned within the aperture.

In some examples, the one or more lock wires can be effective to prevent axial rotation of the distal end of the push wire from the second orientation to the first orientation while the one or more lock wires are positioned within the aperture of the connector.

In some examples, the detachment mechanism can include a microcatheter sized to deliver the endovascular implant to a treatment site while the endovascular implant is in a non-deployed configuration.

In another aspect, a method of constructing an endovascular implant detachment mechanism is disclosed. The method can include providing an endovascular implant including a pinched end. The method can include forming a connector having a first end configured to attach to the pinched end of the endovascular implant, a second end including oblong aperture, and a generally circular cavity that is distal to the oblong aperture. The method can include attaching the first end of the connector to the pinched end. The method can include providing a push wire. The push wire can include a distal end. The method can include flattening the distal end of the push wire into an oblong shape. The method can include forming one or more slotted openings within the flattened distal end of the push wire. The method can include providing one or more lock wires configured to fit into the oblong aperture. The method can include positioning the flattened distal end of the push wire within the oblong aperture of the second end with the flattened distal end in a first orientation (e.g., detached) with respect to the oblong aperture. The method can include securing the push wire to the connector by axially rotating the distal end from the first orientation to a second orientation (attached) with respect to the oblong aperture. The method can include positioning one or more lock wires into the oblong aperture while the distal end of the push wire is in the second orientation.

In some examples, the method can include providing a spring within the generally circular cavity that is configured to rotate the distal end of the push wire from the second orientation to the first orientation in response to the removal of the one or more lock wires.

In some examples, the method can include forming a sloped interior surface within the connector such that the distal end of the push wire rotates from the second orientation to the first orientation in response to pulling the push wire in a proximal direction.

In some examples, the method can include delivering the push wire, the one or more lock wires, the connector, and the endovascular implant to a treatment site through a microcatheter while the endovascular implant is in a non-deployed configuration.

In some examples, the method can further include expanding the endovascular implant to a deployed configuration, removing the one or more lock wires from the oblong aperture of the connector, releasing the distal end of the push wire from the connector by rotating the distal end from the second orientation to the first orientation, and deploying the endovascular implant at the treatment site to occlude a substantially spherical cavity.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIGS. 2A through 2E illustrate a detachment sequence of an implant from the example detachment mechanism of FIG. 1, wherein FIG. 2B is a cross-sectional illustration of the detachment mechanism as indicated in FIG. 2A, according to aspects of the present invention;

FIGS. 3A through 3D illustrate a detachment sequence of another example detachment mechanism having a sloped interior surface, wherein FIG. 3C is a cross-sectional illustration of the detachment mechanism as indicated in FIG. 3B, and wherein FIG. 3D is a cross-sectional illustration of the detachment mechanism as indicated in FIG. 3C, according to aspects of the present invention;

DETAILED DESCRIPTION

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 99%.

Examples presented herein generally include a detachment mechanism that can be used with a braided implant that can be secured within an aneurysm sac and occlude a majority of the aneurysm's neck. The implant can include a tubular braid that can be set into a predetermined shape, compressed for delivery through a microcatheter, and implanted in at least one implanted position that is based on the predetermined shape and the geometry of the aneurysm in which the braid is implanted. When compressed, the implant can be sufficiently short to mitigate friction forces produced when the implant is delivered unsheathed through the microcatheter allowing for a more simplistic delivery system compared to some other known braided embolic implant delivery systems. The implant can be as described in U.S. Pat. No. 10,653,425, the entirety of which is incorporated herein by reference as if included in full, as well as variations thereof, improvements thereof, and alternative braided implants as understood by a person skilled in the pertinent art.

The endovascular implant can include memory shape material that can be heat set to a predetermined shape, can be deformed for delivery through a catheter, and can self-expand to an implanted shape that is based on the predetermined shape and confined by the anatomy of the aneurysm in which it is implanted.

Figure 1A:
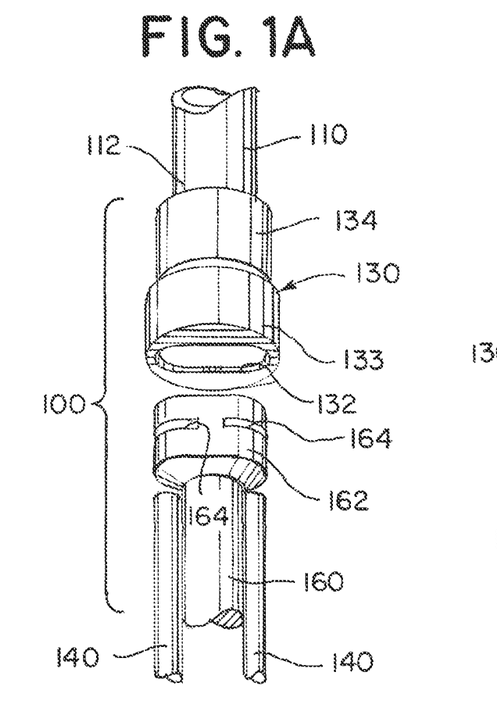
FIG. 1A is an illustration of a detachment mechanism including a connector, push wire, and one or more lock wires in a disconnected state, according to aspects of the present invention.

FIGS. 1A through 1D illustrate a detachment mechanism including a connector, push wire, and one or more lock wires. As shown, the detachment mechanism 100 can include an endovascular implant 110 having a pinched end 112 connected to a first end 134 of a connector 130. The connector 130 can have a first end 134 connected to the endovascular implant 110 and a second end 133. The second end 133 can include an aperture 132. Although aperture 132 is illustrated as being generally oblong, in some embodiments (not pictured), aperture 132 can take on various other forms, such as a triangular shape, rectangular shape, hexagonal shape, etc. The detachment mechanism 100 can include a push wire 160. The push wire 160 can include a distal end 162 that can be a generally flattened portion of the push wire 160. The distal end 162 of the push wire 160 can also include one or more slotted openings 164 and can be sized to fit into the oblong aperture 132 of the second end 133 of the connector when the distal end 162 and the connector 130 are in a first orientation (e.g., as illustrated in FIG. 1A) in which the distal end 162 and connector 130 are aligned such that the flattened portion of distal end 162 are parallel to the flattened portions of the oblong aperture 132. The detachment mechanism can also include one or more lock wires 140.

Figure 1B:
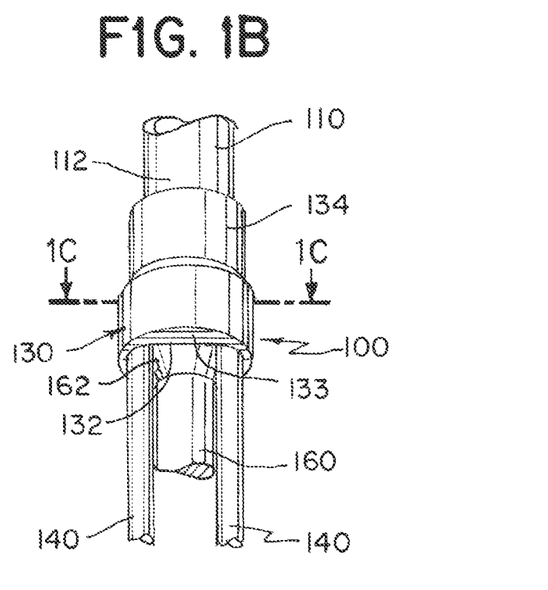
FIG. 1B is an illustration of the detachment mechanism of FIG. 1A in a connected state, according to aspects of the present invention.

FIG. 1B is an illustration of the detachment mechanism of FIG. 1A in a connected state. To attach the connector 130 to the push wire 160, the distal end 162 of the push wire 160 can be inserted into the oblong aperture 132 in the first orientation, the push wire 160 can then be rotated axially approximately 90° to move the distal end 162 to a second orientation, and then the one or more lock wires 140 can be inserted into the oblong aperture 132 of the connector 130 while the distal end 162 of the push wire 160 is in the second orientation within the oblong aperture 132. In some examples, the detachment mechanism 100 can employ 2 lock wires 140. In some examples, the detachment mechanism 100 can employ 1 lock wire 140. In other examples, the detachment mechanism 100 can employ multiple lock wires 140.

Figure 1C:
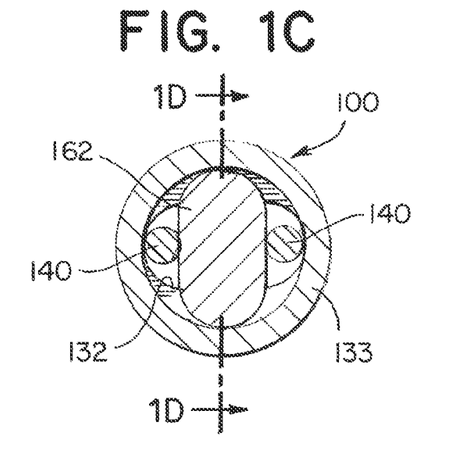
FIG. 1C is a cross-sectional illustration of the detachment mechanism as indicated in FIG. 1B, according to aspects of the present invention.
Figure 1D:
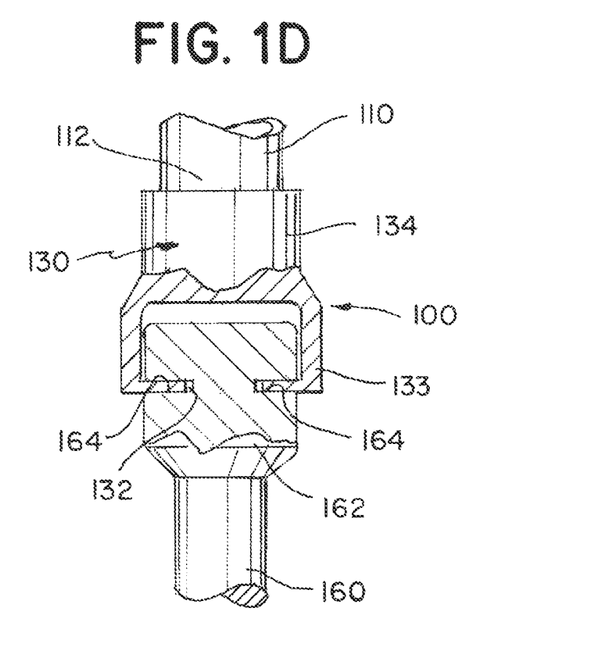
FIG. 1D is a cross-sectional illustration of the detachment mechanism as indicated in FIG. 1C, according to aspects of the present invention.

FIG. 1C is a cross-sectional illustration of the detachment mechanism as indicated in FIG. 1B. FIG. 1D is a cross-sectional illustration of the detachment mechanism as indicated in FIG. 1C. The one or more slotted openings 164 of push wire 160 can be configured to mate with a wall of the oblong aperture 132 such that a portion of the wall of the oblong aperture 132 interfaces with the one or more slotted openings 164 when the distal end 162 is rotated into the second orientation to lock the connector to the push wire 160. That is, a portion of the wall of the oblong aperture 132 can reside within the one or more slotted openings 164 when the distal end 162 of the push wire 160 is in the second orientation.

Figures 2A, 2B, 2C, 2D:
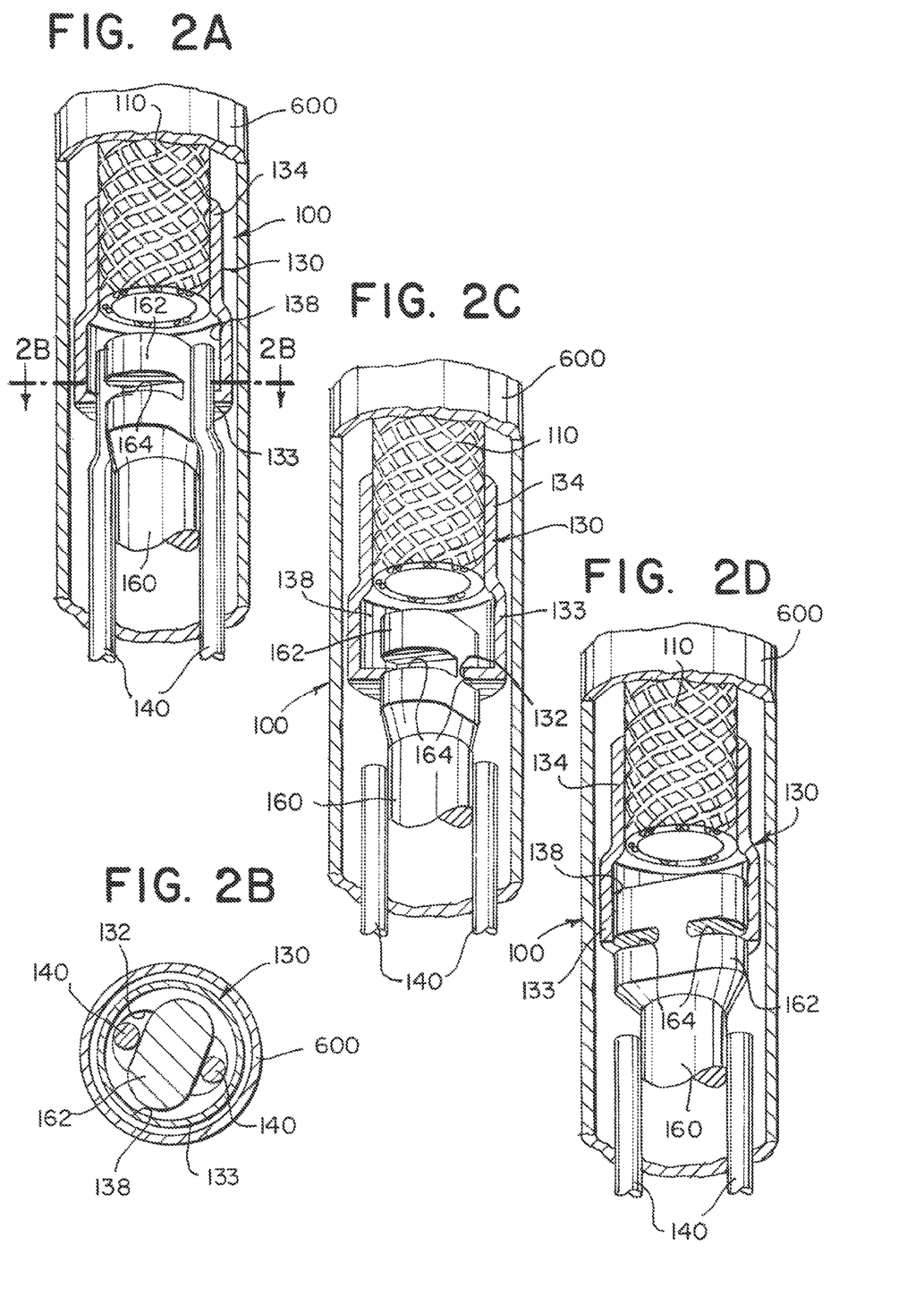

FIGS. 2A through 2E illustrate a detachment sequence of an implant from the example detachment mechanism of FIGS. 1A through 1D. FIG. 2A shows the detachment mechanism 100 being delivered through a microcatheter 600 to a treatment site with the endovascular implant 110 in a non-deployed (e.g., collapsed) configuration. The connector 130 is shown in cut-away view for the sake of illustration. As shown, the distal end 162 of push wire 160 is in a second (e.g., attached) orientation with respect to the connector 130. In the second orientation, the push wire 160 is connected to the connector 130 and the endovascular implant 110. As shown, the one or more lock wires 140 are configured to fit through the oblong aperture 132 and into the generally circular cavity 138 while the distal end 162 of the push wire 160 is in the second orientation. In FIG. 2A, the endovascular implant 110 is attached to the push wire 160 via the connector.

FIG. 2B is a cross-sectional illustration of the detachment mechanism as indicated in FIG. 2A. The cross-sectional illustration of FIG. 2B is similar to that of FIG. 1C, with the addition of the microcatheter 600 in FIG. 2B.

FIG. 2C shows the one or more lock wires 140 after they have been pulled proximally and have exited the generally circular cavity 138. The connector 130 is shown in cut-away view for the sake of illustration. The first step of the detachment sequence can include pulling the one or more lock wires 140 proximally. As shown, the one or more lock wires 140 can exit the oblong aperture 132 of connector 130, thereby allowing the push wire 160 to be rotated from the second (e.g., attached) orientation to the first (e.g., detached) orientation. Although the arrow shows a clockwise rotation, in some configurations the push wire 160 can be rotated in an anti-clockwise direction in order to transition the push wire 160 from the second orientation to the first orientation.

FIG. 2D shows the detachment mechanism 100 after the push wire 160 has been rotated from the second orientation to the first orientation. The connector 130 is shown in cut-away view for the sake of illustration. In the second orientation, no portion of the wall of the oblong aperture 132 is interfacing with the one or more slotted grooves 164 of the distal end 162 of push wire 160. In other words, distal end 162 of the push wire can be removed from the oblong aperture 132 without any interference.

Figure 2E:
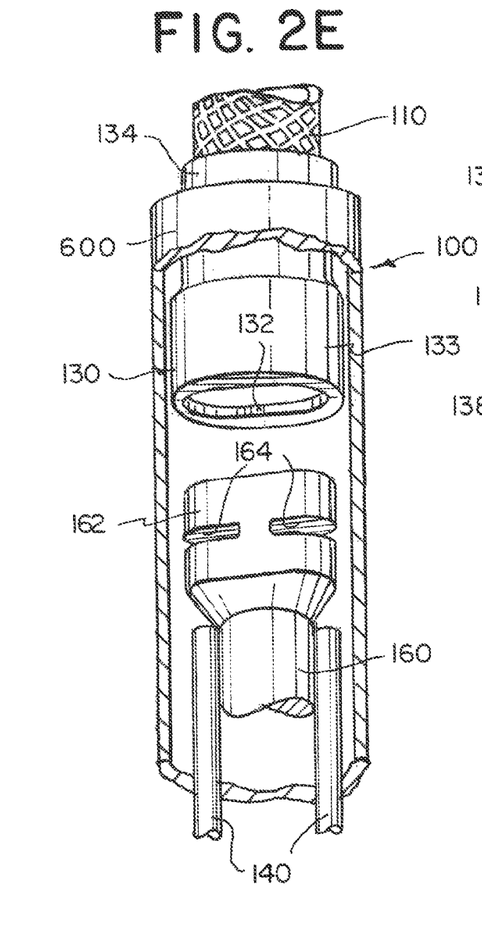

FIG. 2E shows the connector 130 fully disengaged from the push wire 160 as the push wire 160, the one or more lock wires 140, and microcatheter 600 are withdrawn. As microcatheter 600 is withdrawn, the endovascular implant 110 can be configured to expand from a non-deployed (e.g., collapsed) configuration to a deployed (e.g., expanded) configuration such that endovascular implant 110 is effective to occlude a substantially spherical cavity at a treatment site. According to some examples, the substantially spherical cavity can be an aneurysm within a patient.

FIGS. 3A through 3D illustrate a detachment sequence of another example detachment mechanism 100 having a sloped interior surface 136. In this embodiment, the connector 130 can have a sloped interior surface 136 within the generally circular cavity 138 such that upon removal of the one or more lock wires 140, the distal end 162 of the push wire 160 is urged to transition from the second (e.g., attached) orientation to the first (e.g., unattached) orientation in response to the push wire 160 being pulled in a proximal direction. That is, an operator of a detachment mechanism 100 having a sloped interior surface 136 may not need to rotate the push wire 160 in order to disengage push wire 160 from the connector 130. Rather, by pulling the push wire 160 proximally, the distal end 162 can automatically rotate to the first (e.g., disengaged) orientation from the second (e.g., engaged) orientation.

Figure 3A:
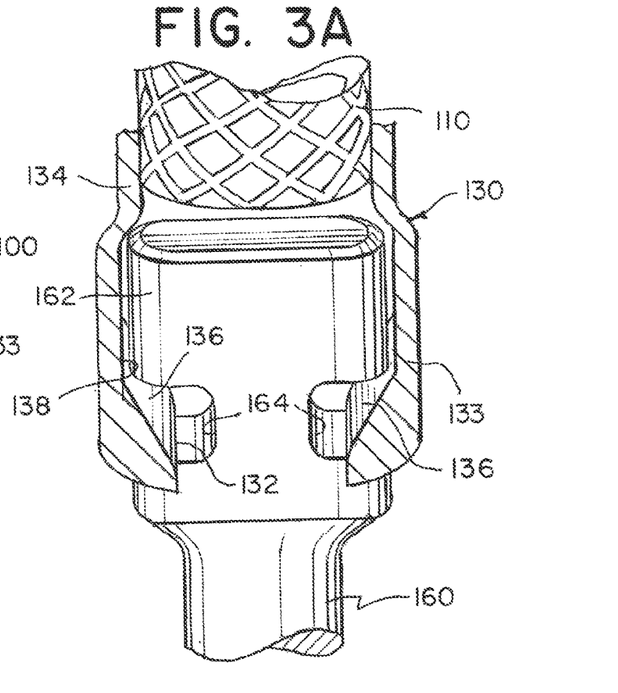

FIG. 3A shows a side view of the detachment mechanism 100 having a sloped interior surface 136 in a connected configuration. The connector 130 is shown in cut-away view for the sake of illustration. The distal end 162 of the push wire 160 is in the first orientation within the connector 130. The detachment mechanism can include pull wires 140 (not illustrated). The distal end 162 of the push wire 160 can be secured to the connector by the pull wires 140 similar to as illustrated in FIGS. 1A through 1D, and the implant 110 can be moved by the push wire 160 through a microcatheter 600 similar to as illustrated in FIG. 2A. The pull wires 140 can be retracted similar to as illustrated in FIG. 2B to allow the distal end 162 of the push wire 160 to rotate.

Figure 3B:
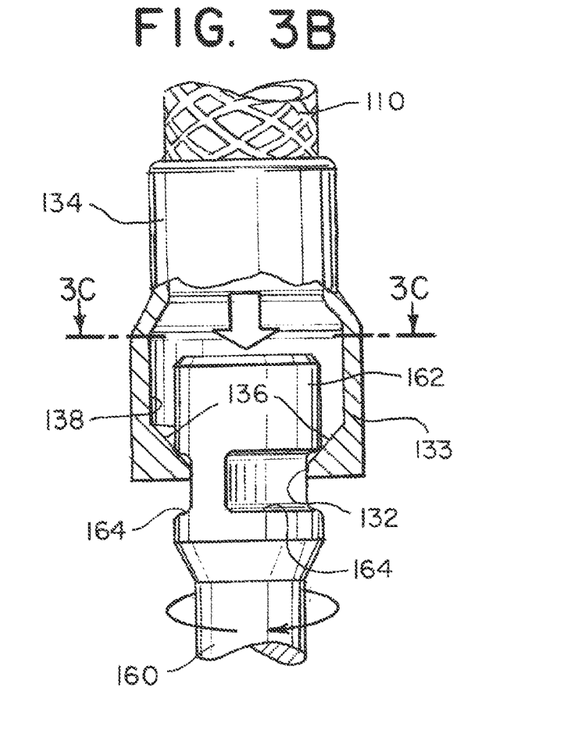

FIG. 3B shows a side view of the detachment mechanism of FIG. 3A as the push wire 160 is being pulled proximally. The connector 130 is shown in cut-away view for the sake of illustration. The sloped surfaces 136 facilitate the rotation of the distal end 162 of the push wire 160 from the first orientation to the second orientation as the push wire 160 is pulled proximally.

Figure 3C:
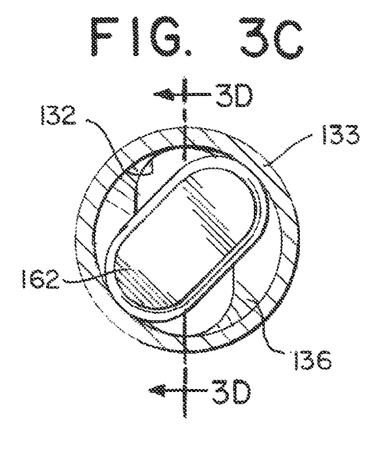

FIG. 3C is a cross-sectional view of the detachment mechanism as indicated in FIG. 3B.

Figure 3D:
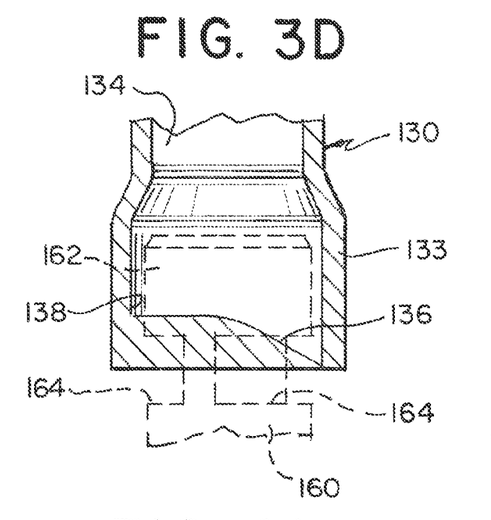

FIG. 3D is a cross-sectional illustration of the detachment mechanism as indicated in FIG. 3C.

Figure 4A:
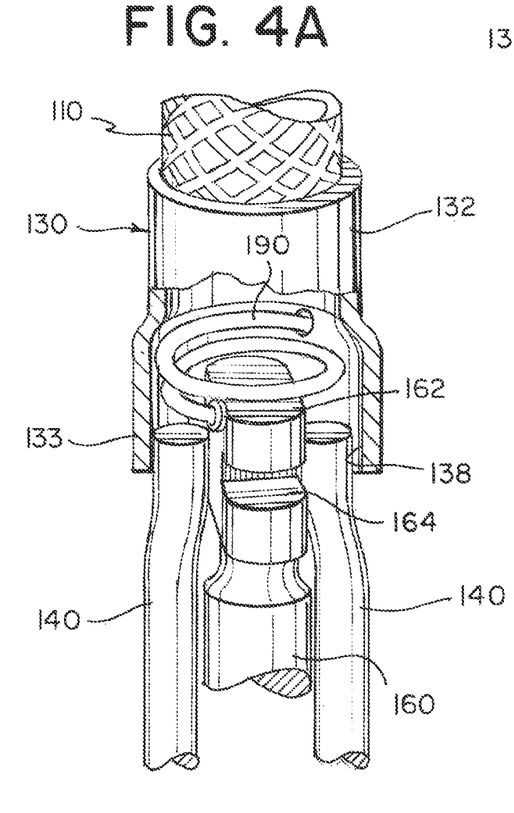
FIGS. 4A through 4C illustrate a detachment sequence of an example implant from another example detachment mechanism, according to aspects of the present invention.
Figure 4B:
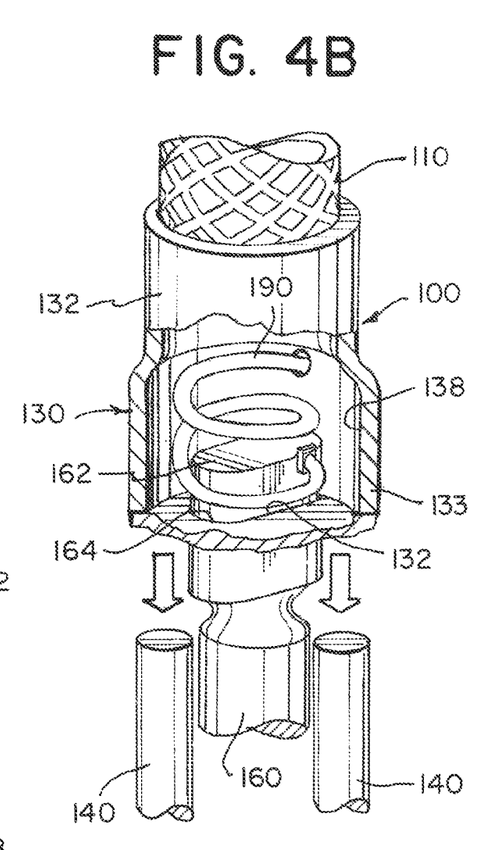
Figure 4C:
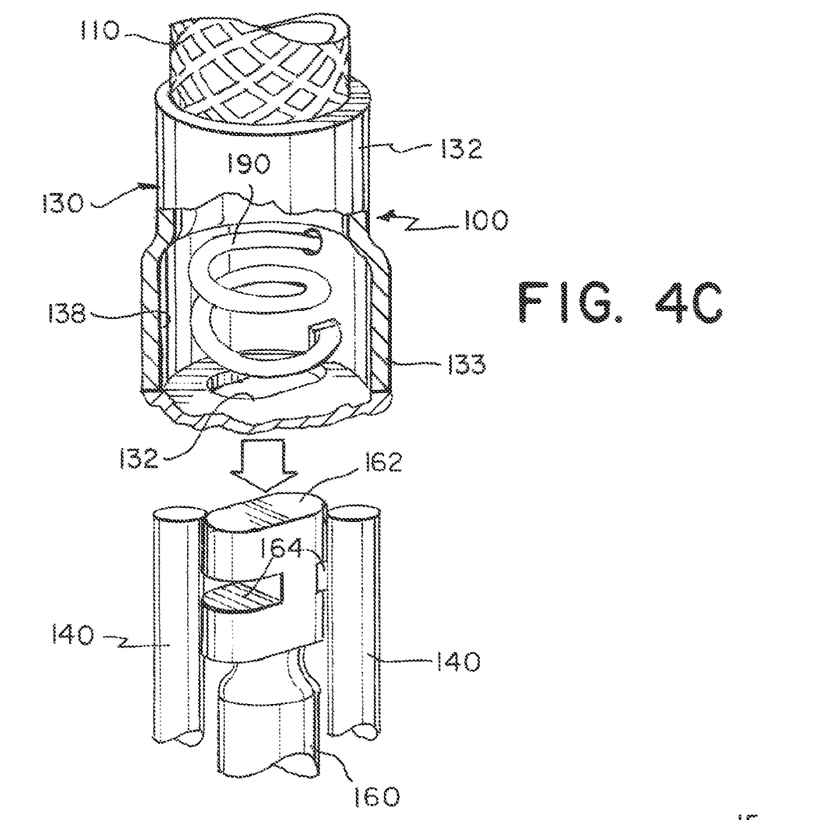

FIGS. 4A through 4C illustrate a detachment sequence of another example detachment mechanism having a spring. The detachment mechanism 100 as shown is similar to the examples previously described except that this example detachment mechanism includes a spring 190 that is integrated within the generally circular cavity 138 of connector 130. More specifically, the spring 190 can be mounted within the generally circular cavity 138 such that the spring 190 interfaces with the distal end 162 of the push wire 160. The spring 190 can be configured to be in a wound configuration while the push wire 160 is in the second (e.g., attached) configuration.

As shown in FIG. 4A, the one or more lock wires 140 can be pulled proximally to initiate the detachment sequence. In FIG. 4B, the one or more lock wires 140 are removed, and the spring 190 applies a rotational force to the distal end 162 of the push wire 160, thereby moving the distal end 162 from the second (e.g., attached) orientation to the first (e.g., detached) orientation. FIG. 4C shows the connector 130 fully disengaged from the push wire 160 as the push wire 160, the one or more lock wires 140, and microcatheter 600 are withdrawn. As microcatheter 600 is withdrawn, the endovascular implant 110 can be configured to expand from a non-deployed (e.g., collapsed) configuration to a deployed (e.g., expanded) configuration such that endovascular implant 110 is effective to occlude a substantially spherical cavity at a treatment site. According to some examples, the substantially spherical cavity can be an aneurysm within a patient.

Features of the example detachment features disclosed herein can be combined as understood by a person skilled in the pertinent art. For instance, the spring 190 illustrated in FIGS. 4A through 4C can be added to the detachment features illustrated in FIGS. 1A through 3C.

Figure 5:
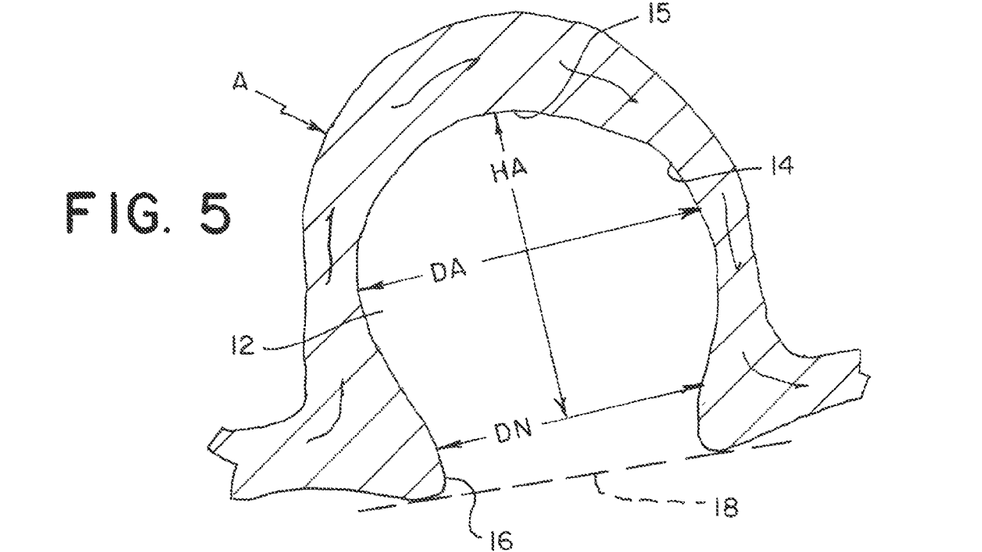
FIG. 5 is an illustration of an example aneurysm to be occluded by an implant.

FIG. 5 is an illustration of an example aneurysm to be occluded by an implant. FIG. 5 illustrates height HA, sac diameter DA, and neck diameter DN measurements of a spherical cavity A. In some examples, spherical cavity can be an aneurysm of a patient. The location of the plane 18 defining a boundary between the spherical cavity A and blood vessels is also illustrated. As shown, the spherical cavity A can include a neck 16, a wall 14, and a distal wall 15. The spherical cavity A can also include a spherical cavity interior 12. The endovascular implant 110 can be configured to occlude the spherical cavity A after it is disengaged from the detachment mechanism 100 as described above.

Figure 6:
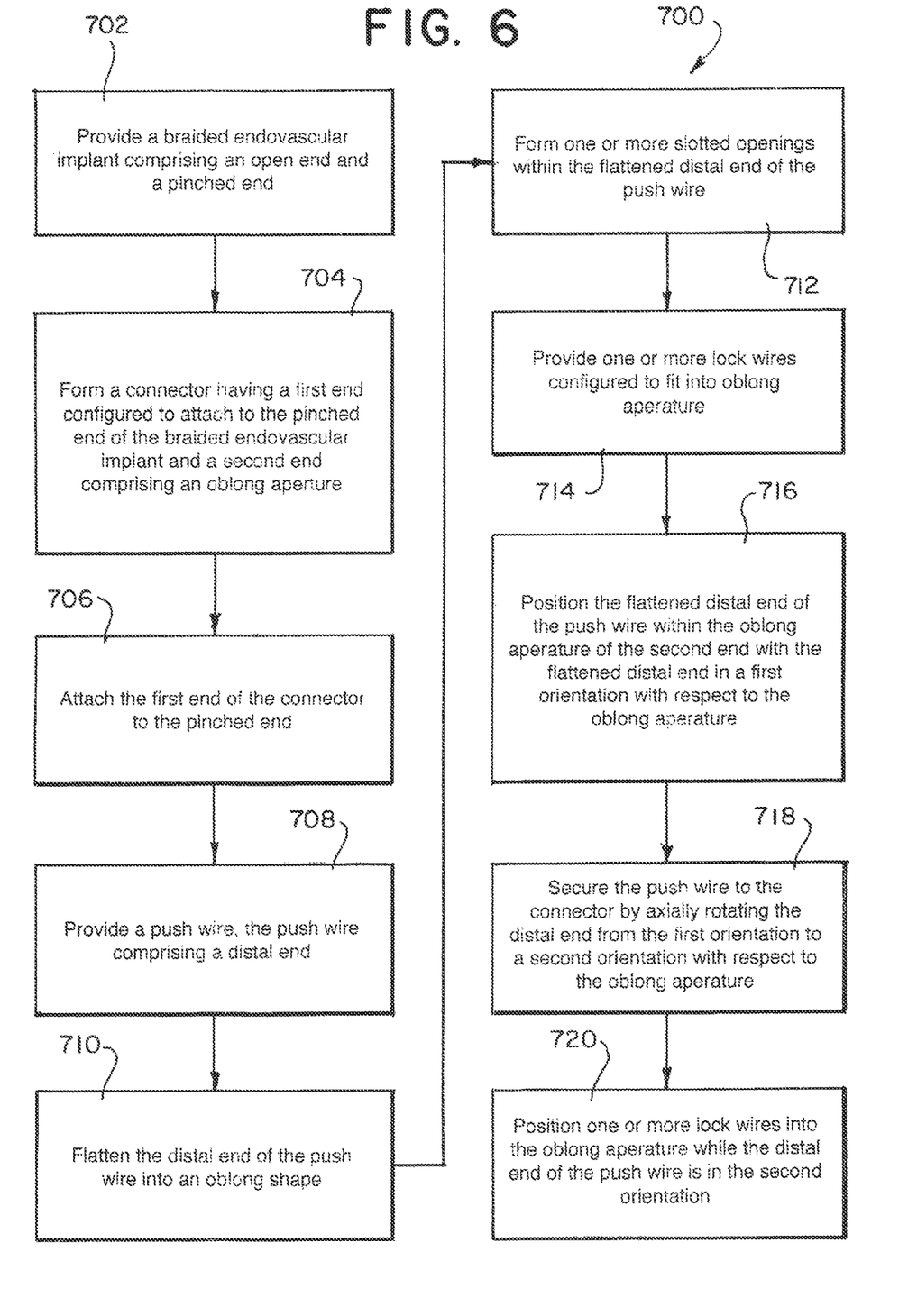
FIG. 6 is a flowchart of a method for constructing a detachment mechanism according to aspects of the present invention.

FIG. 6 is a flowchart of a method 700 for constructing a detachment mechanism. In block 702, the method may include providing an endovascular implant 110 that includes an open end 114 and a pinched end 112. The implant can be a braided endovascular implant in some examples. In block 704, the method can include forming a connector 130. The connector 130 can have a first end that is configured to attach to the pinched end 112 of the implant 110. The pinched end 112 can be configured to fit into the first end 134 of the connector 130 with an interference fit. Other adhesion methods can be used, including glues, welding, etc. The connector can be formed with a second end 133. The second end 133 can be shaped to have an oblong aperture 132. The interior of the connector 130 can be a generally circular cavity 138, and in some other examples, the interior of the connector 130 can be a sloped interior surface.

In block 706 the method can include attaching the first end 134 of the connector to the pinched end 112. As discussed above, the pinched end 112 of the implant 110 can be adhered to the first end 134 with an interference fit, or with another method of adhesion, such as an adhesive glue, welding, etc.

In block 708, the method can include providing a push wire 160. The push wire can include a distal end 162. The push wire can be made of any suitable material, such as a metal alloy. In some examples, the push wire can be made at least partially of a memory shape material, such as Nitinol.

In block 710, the method can include flattening the distal end 162 of the push wire 160 into an oblong shape. Flattening the distal end 162 of the push wire 160 into an oblong shape can be accomplished by any desired method such as pressing the generally circular distal end 162 in a press until the generally circular shape deforms into a generally oblong shape.

In block 712, the method can include forming one or more slotted openings 164 within the flattened distal end 162 of the push wire. For example, one or more slotted openings 164 can be cut into the flattened distal end 162 using an appropriate grinding tool, a laser etching procedure, or any other appropriate technique known in the pertinent art.

In block 714, the method can include providing one or more lock wires 140 configured to fit into the oblong aperture 132. The one or more lock wires can be constructed of a suitable metal alloy, and in some examples, can be constructed of a memory shape material, such as Nitinol.

In block 716, the method can include positioning the flattened distal end 162 of the push wire 1260 within the oblong aperture 132 of the second end 133 with the flattened distal end 162 in a first orientation with respect to the oblong aperture 132. For example, in the first orientation, the oblong aperture 132 can be aligned with the flattened distal end 162 such that the elongated flattened portions of the flattened distal end 162 align with the elongated portions of the oblong aperture 132.

In block 718, the method can include securing the push wire 160 to the connector 130 by axially rotating the distal end 162 from the first orientation to a second orientation with respect to the oblong aperture 132. In some examples, the second orientation can be rotated approximately 90 degrees with respect to the first orientation.

In block 720, the method can include positioning one or more lock wires 140 into the oblong aperture 132 while the distal end 162 of the push wire is in the second orientation. The one or more lock wires 140 can be configured to fit into the oblong aperture 132 when the distal end 162 is in the second orientation with respect to the oblong aperture 132 such that the one or more lock wires 140 prevent the distal end 162 of the push wire 160 to be rotated to the first orientation while the one or more lock wires 140 are within the oblong aperture 132. Upon removal of the one or more lock wires 140, the distal end 162 of the push wire 160 can be rotated from the second orientation to the first orientation to allow the push wire 160 to be disconnected from the connector 130.

The descriptions contained herein are examples of embodiments of the invention and are not intended in any way to limit the scope of the invention. As described herein, the invention contemplates many variations and modifications of the implant, including alternative materials, alternative geometries, alternative detachment features, alternative delivery systems, alternative means for forming a braid into a predetermined shape, alternative treatment methods, etc. These modifications would be apparent to those having ordinary skill in the art to which this invention relates and are intended to be within the scope of the claims which follow.

What is claimed is:

1. An endovascular implant detachment mechanism, comprising:
   an endovascular implant comprising a pinched end;
   a connector attached to the pinched end at a first end and comprising an aperture at a second end;
   a generally circular cavity distal to the aperture;
   a push wire having a distal end, the distal end comprising one or more slotted openings, the distal end configured to fit into the aperture in a first orientation with respect to the aperture;
   and one or more lock wires configured to fit into the aperture while the distal end of the push wire is in a second orientation,
   wherein axial rotation of the push wire causes the distal end of the push wire to move from the first orientation into the second orientation, thereby securing the push wire to the endovascular implant.

2. The endovascular implant detachment mechanism of claim 1, wherein the connector is configured to detach from the push wire in response to removal of the one or more lock wires from the aperture and axial rotation of the distal end of the push wire from the second orientation to the first orientation.

3. The endovascular implant detachment mechanism of claim 2, further comprising a spring integrated within the generally circular cavity configured to rotate the distal end of the push wire from the second orientation to the first orientation in response to the removal of the one or more lock wires.

4. The endovascular implant detachment mechanism of claim 3, wherein the one or more lock wires are configured to prevent the spring from rotating the distal end of the push wire from the second orientation to the first orientation while the one or more lock wires are positioned within the aperture.

5. The endovascular implant detachment mechanism of claim 1, wherein the connector further comprises a sloped interior surface that is configured to facilitate axial rotation of the distal end of the push wire from the second orientation to the first orientation in response to pulling the push wire in a proximal direction.

6. The endovascular implant detachment mechanism of claim 1, wherein the one or more lock wires comprise two lock wires.

7. The endovascular implant detachment mechanism of claim 1, wherein the one or more lock wires are effective to prevent axial rotation of the distal end of the push wire from the second orientation to the first orientation while the one or more lock wires are positioned within the aperture of the connector.

8. The endovascular implant detachment mechanism of claim 1, further comprising a microcatheter sized to deliver the endovascular implant to a treatment site while the endovascular implant is in a non-deployed configuration.

9. The endovascular implant detachment mechanism of claim 8, wherein the push wire is configured to push the endovascular implant through the microcatheter and to the treatment site.

10. The endovascular implant detachment mechanism of claim 1, wherein the endovascular implant is configured to expand to a deployed configuration to occlude a substantially spherical cavity.

11. An endovascular implant detachment mechanism, comprising:
    an endovascular implant comprising a pinched end;
    a connector attached to the pinched end at a first end and comprising an aperture at a second end;
    a generally circular cavity distal to the aperture;
    a push wire having a distal end, the distal end comprising one or more slotted openings, the distal end configured to fit into the aperture in a first orientation with respect to the aperture;
    one or more lock wires configured to fit into the aperture while the distal end of the push wire is in a second orientation; and
    a spring disposed within the generally circular cavity, the spring configured to rotate the distal end of the push wire from the second orientation to the first orientation in response to removal of the one or more lock wires,
    wherein axial rotation of the push wire causes the distal end of the push wire to move from the first orientation to the second orientation, thereby securing the push wire to the endovascular implant.

12. The endovascular implant detachment mechanism of claim 11, wherein the connector is configured to detach from the push wire in response to the removal of the one or more lock wires from the aperture and axial rotation of the distal end of the push wire from the second orientation to the first orientation.

13. The endovascular implant detachment mechanism of claim 11, wherein the one or more lock wires are configured to prevent the spring from rotating the distal end of the push wire from the second orientation to the first orientation while the one or more lock wires are positioned within the aperture.

14. The endovascular implant detachment mechanism of claim 11, wherein the one or more lock wires are effective to prevent axial rotation of the distal end of the push wire from the second orientation to the first orientation while the one or more lock wires are positioned within the aperture of the connector.

15. The endovascular implant detachment mechanism of claim 11, further comprising a microcatheter sized to deliver the endovascular implant to a treatment site while the endovascular implant is in a non-deployed configuration.

16. A method of constructing an endovascular implant detachment mechanism, comprising:
    providing an endovascular implant comprising a pinched end;
    forming a connector having a first end configured to attach to the pinched end of the endovascular implant, a second end comprising an oblong aperture, and a generally circular cavity distal to the oblong aperture;
    attaching the first end of the connector to the pinched end;
    providing a push wire, the push wire comprising a distal end;
    flattening the distal end of the push wire into an oblong shape to form a flattened distal end of the push wire;
    forming one or more slotted openings within the flattened distal end of the push wire;
    providing one or more lock wires configured to fit into the oblong aperture;

positioning the flattened distal end of the push wire within the oblong aperture of the second end with the flattened distal end in a first orientation with respect to the oblong aperture;

securing the push wire to the connector by axially rotating the distal end from the first orientation to a second orientation with respect to the oblong aperture; and positioning one or more lock wires into the oblong aperture while the distal end of the push wire is in the second orientation.

17. The method of claim 16, further comprising providing a spring within the generally circular cavity configured to rotate the distal end of the push wire from the second orientation to the first orientation in response to removal of the one or more lock wires.

18. The method of claim 16, further comprising forming a sloped interior surface within the connector such that the distal end of the push wire rotates from the second orientation to the first orientation in response to pulling the push wire in a proximal direction.

\* \* \* \* \*